(12) United States Patent
Tsai et al.

(10) Patent No.: US 8,488,002 B2
(45) Date of Patent: Jul. 16, 2013

(54) TESTING METHOD AND TESTING APPARATUS FOR TV SYSTEM

(75) Inventors: Yu-Fen Tsai, Hsinchu County (TW); Ching-Chun Huang, Hsinchu County (TW)

(73) Assignee: MStar Semiconductor, Inc., Zhubei (TW)

( * ) Notice: Subject to any disclaimer, the term of this patent is extended or adjusted under 35 U.S.C. 154(b) by 0 days.

(21) Appl. No.: 13/476,120

(22) Filed: May 21, 2012

(65) Prior Publication Data
US 2013/0147967 A1    Jun. 13, 2013

(30) Foreign Application Priority Data
Dec. 9, 2011    (TW) .............................. 100145659 A

(51) Int. Cl.
*H04N 17/00*    (2006.01)

(52) U.S. Cl.
USPC .......................................... 348/181; 348/192

(58) Field of Classification Search
USPC ................. 348/189, 180, 181, 184, 192, 725, 348/734; 702/108, 117, 118, 122
IPC .................................... H04N 17/00,17/02, 5/44
See application file for complete search history.

(56) References Cited

U.S. PATENT DOCUMENTS 7,136,092 B2 * 11/2006 Whitehouse ................... 348/182
2008/0036865 A1 * 2/2008 Liu ............................... 348/180

* cited by examiner

*Primary Examiner* — Sherrie Hsia
(74) *Attorney, Agent, or Firm* — WPAT, PC; Justin King

(57) ABSTRACT

A testing apparatus for a television system is provided. The testing apparatus includes an analysis module, a signal generating module, a transmitting module, a receiving module, and a judging module. The analysis module receives and analyzes a control signal to generate an analysis result. The signal generating module generates a test signal according to the analysis result. The transmitting module transmits the test signal to the television system. The receiving module receives a response signal from the television system. The judging module judges whether the response signal correctly corresponds to the test signal.

22 Claims, 3 Drawing Sheets

TESTING METHOD AND TESTING APPARATUS FOR TV SYSTEM

This application claims the benefit of Taiwan application Serial No. 100145659, filed Dec. 9, 2011, the subject matter of which is incorporated herein by reference.

BACKGROUND OF THE INVENTION

1. Field of the Invention

The invention relates in general to a testing technique, and more particularly, to a testing technique for a remote control function of a television system.

2. Description of the Related Art

With the modern development of electronic products, multimedia systems, such as home theaters, have become prevalent in many households. In a multimedia system, image display equipment is one of the most crucial hardware devices. Therefore, it is a critical issue drawing much attention of image display equipment manufacturers to ensure that products leaving a factory are in proper working order. To ensure that the products function as expected, various tests are often performed. For example, the tests usually include judgments of whether a television system correctly receives remote control signals and executes corresponding procedures (e.g., turning on, turning off, and switching channels). By identifying malfunctioning products in advance, repairing, refund, or exchange of faulty devices may be effectively avoided to the satisfaction of the consumers.

Current wireless remote controllers are generally based on radio frequency (RF) or optic sensing technologies. That is, RF signals or infrared signals are utilized as control signals for communicating with a host. In current tests for remote functions of a television system, test personnel control a remote controller to transmit a control signal, and observe with the naked eye for corresponding responses from the television system. Obviously, the manufacturers can only afford random sampling of a minority of products for testing due to limited manpower.

Moreover, specifications of remote control signals adopted by different manufacturers are usually different. In other words, a remote control signal suitable for a television system of one manufacturer may not conform to a specification of another television system. Moreover, panel arrangements of remote controllers of different manufacturers may also vary. The above issues exacerbate complexities of testing procedures for various types of television systems.

SUMMARY OF THE INVENTION

To overcome the above issues, the invention is directed to a testing apparatus and testing method for a television system. By automating and making good use of most part of a test procedure, the testing apparatus and testing method of the present invention are capable of reducing large amounts of human resources to increase overall testing efficiency.

According to an embodiment the present invention, a testing apparatus for a television system comprises an analysis module, a signal generating module, a transmitting module, a receiving module, and a judging module. The analysis module receives and analyzes a control signal to generate an analysis result. The signal generating module generates a test signal according to the analysis result. The transmitting module transmits the test signal to the television system. The receiving module receives a response signal from the television system. The judging module judges whether the response signal correctly corresponds to the test signal.

According to another embodiment the present invention, a testing method for a television system is provided. The method comprises steps of: receiving and analyzing a control signal to generate an analysis result, generating a test signal according to the analysis result, receiving a response signal from the television system after transmitting the test signal, and judging whether the response signal correctly corresponds to the test signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
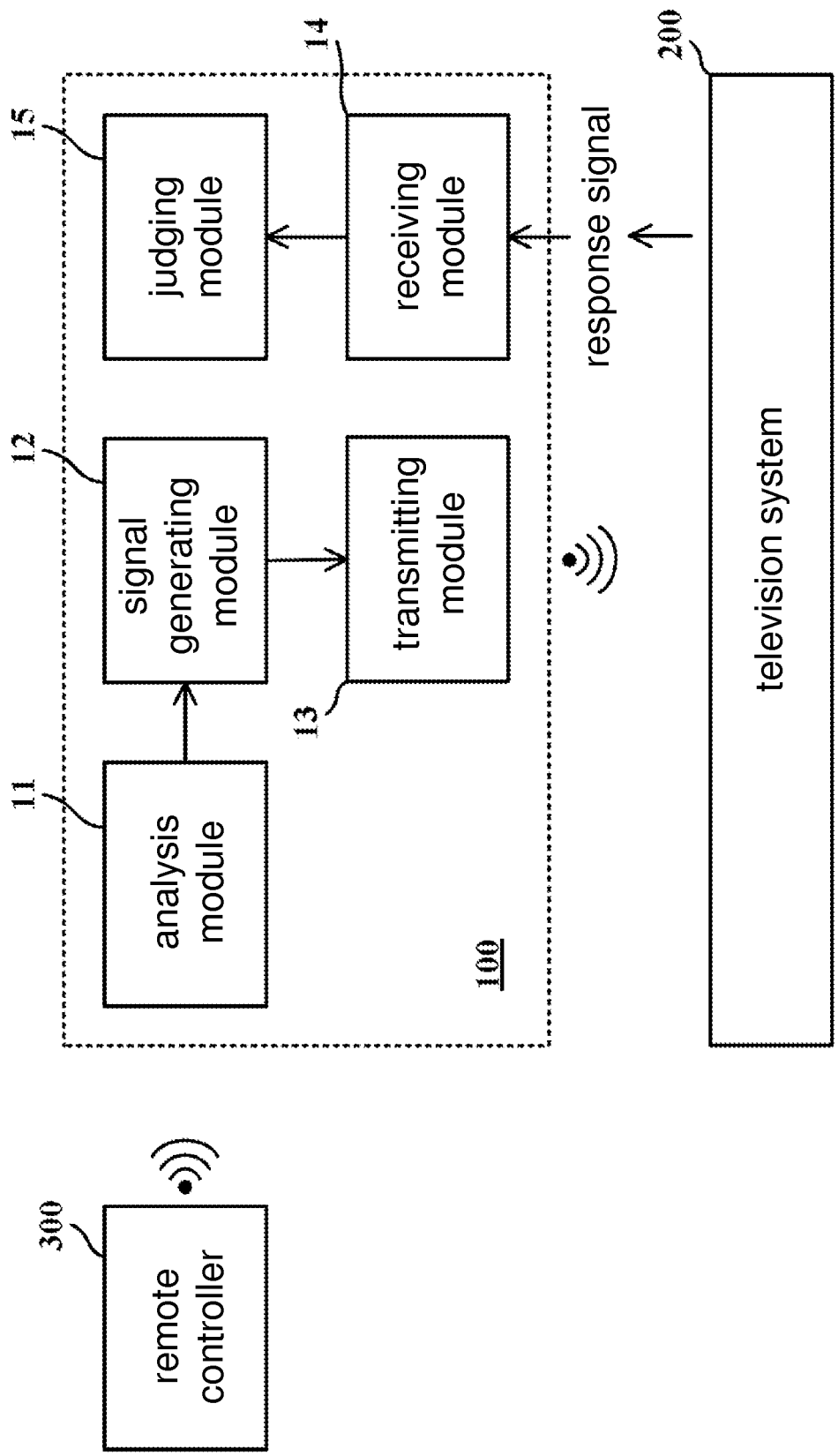
FIG. 1 is a block diagram of a testing apparatus according to an embodiment of the present invention.

FIG. 1 shows a block diagram of a testing apparatus 100 according to an embodiment of the present invention. The testing apparatus 100 comprises an analysis module 11, a signal generating module 12, a transmitting module 13, a receiving module 14, and a judging module 15. The testing apparatus 100 is for testing whether remote control functions of a television system 200 are normal. For example, signals received and transmitted by the television system 200 may be infrared signals or RF signal.

Before a testing procedure begins, a remote controller 300 suitable for the television system 100 is first controlled to generate a control signal. For example, the remote controller 300 may be controlled to generate a power-on signal, a power-off signal, a volume-adjusting signal, or a channel-selecting signal. The control signals may have different waveforms, e.g., different pulse lengths and/or different pulse timings. In practice, the control for the remote controller 300 for generating the control signals may be manually performed by test personnel.

The analysis module 11 receives and analyzes the control signal to generate an analysis result. The signal generating module 12 generates a test signal according to the analysis result. For example, the analysis result may indicate that the power-on signal acceptable by the television system includes sequentially one long pulse and three short pulses. The signal generating module 12 may accordingly simulate a test signal having a same waveform as that of the control signal. In another example, the signal generating module 12 generates an infrared test signal in response to an infrared control signal. The transmitting module 13 then transmits the test signal to the television system 200.

If a remote control of the television system 200 is functional, the test signal transmitted from the transmitting module 13 prompts the television 200 to generate a response signal corresponding to the test signal. The receiving module 14 receives the response signal from the television system 200. In an embodiment, the test procedure is set according to a code of the television system 200, such that the television system 200 generates a predetermined response signal after receiving the test signal, and transmits the response signal via a data transmission interface (e.g., an RS-232 or USB interface) back to the receiving module 14.

Given that the response signal is correct, i.e., the response signal matches the predetermined response signal, the judging module 15 judges that the remote control function of the television system 200 is functional. Conversely, when the receiving module 14 does not receive the response signal or the response signal is incorrect, the judging module 15 judges that the remote control function of the television system 200 is malfunctioning.

In another embodiment, the receiving module 14 comprises a capturing module for capturing a displayed image of the television system 200 to generate a captured result. The captured result serves as the response signal. For example, before powering on, the displayed image of the television system 200 may be an almost entirely blank image. After receiving the power-on test signal transmitted by the transmitting module 13, the captured result received by the receiving module 13 is expected to change to a program image played by the television system 200. By comparing the captured result and a reference image, the judging module 15 is allowed to judge whether the remote control function of the television system 200 is functional.

It should be noted that, the above test signal is not limited to a power-on signal. The signal generating module 12 may generate different types of test signals that are then sequentially transmitted by the transmitting module 13. Since content of the test signals transmitted by the transmitting module 13 is predetermined, the judging module 15 may correspondingly judge whether the testing signal triggers correct responses of the television system 200 according to the response signals. In other words, the test signal may also be designed to include a plurality of sub test signals successively transmitted to the television system 100. The sub test signals may respectively correspond to a power-on signal, a power-off signal, a volume-adjusting signal, and a channel-selecting signal, and the test signal may be any operable combination of the sub test signals.

Figure 2:
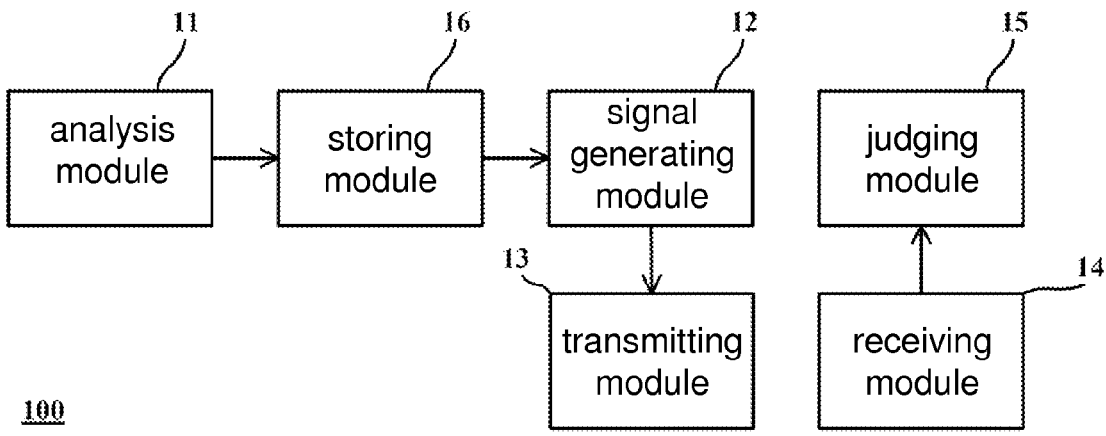
FIG. 2 is a block diagram of the testing apparatus in FIG. 1 further comprising a storing module according to an embodiment of the present invention.

Referring to FIG. 2, the analysis result generated by the analysis module 11 may be stored in a storing module 16 as reference for generating subsequent test signals. Accordingly, test personnel only need to control the remote controller 300 once before the first test to generate the standard test control signal, and subsequent test procedure would be automatically completed by the testing apparatus 100. Further, the analysis result generated by the analysis module 11 may be provided to the signal generating module 12 to generate test signals for other television systems. More specifically, the analysis result generated by the analysis module 11 may be utilized as a test basis for television systems having same remote control signal specifications as those of the television system 200. That is to say, the analysis result generated by the analysis module 11 may be repeatedly utilized to eliminate complications caused by repetitive manual operations on the remote controller 300.

In an embodiment, the storing module 16 stores a plurality of analysis results corresponding to a plurality of types of television system. In other words, the storing module 16 may store a database associated with various standard control signals. According to a feature (e.g., a manufacture or model number) of a television system under test, the signal generating module 12 may select from the storing module an analysis result corresponding to the television system and generate the test signal according to the selected analysis result. Thus, the testing apparatus 100 offers testing flexibilities for adapting to different types of television systems.

In an embodiment, apart from analyzing the control signal generated by the remote controller 300, the analysis module 11 also receives and analyzes the test signal generated by the signal generating module 12 before the test signal is transmitted to the television system 200. By comparing a difference between the test signal and the control signal, the analysis module 11 may further generate a signal modification suggestion to be referenced by the signal generating module 12, and thereby assisting the signal generating module 12 in generating a test signal more approximate to the control signal.

In another embodiment, by repetitively comparing the difference between the control signals of the various types of television systems and the corresponding test signals stored in the database, the analysis module 11 may generate a plurality of signal modification suggestions for modifying current content stored in the storing module 16.

Figure 3:
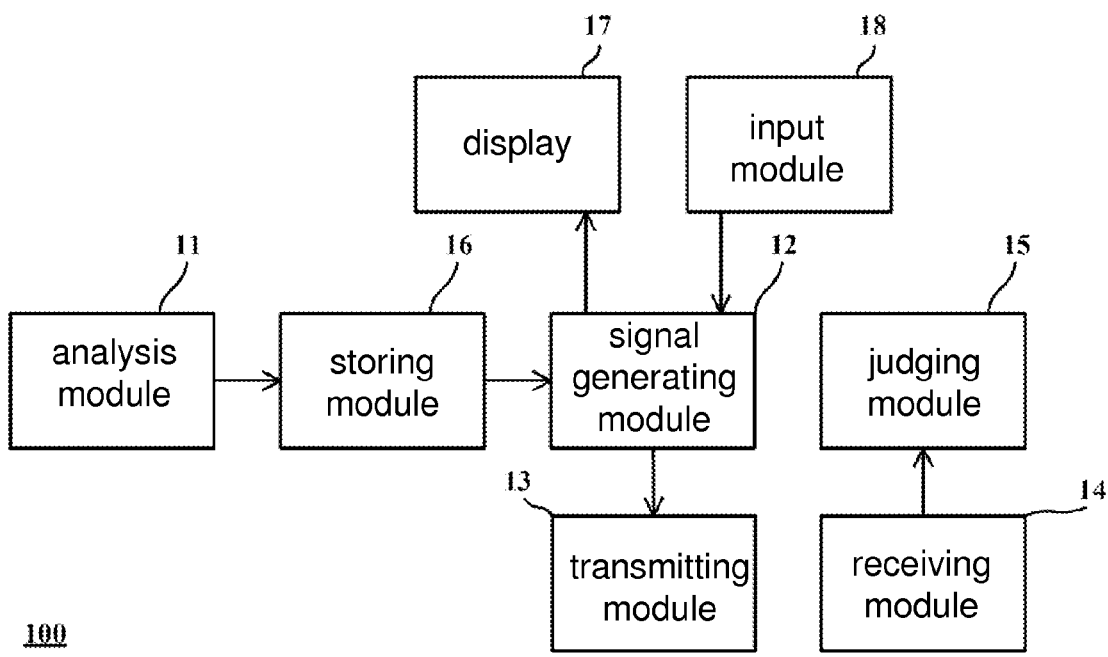
FIG. 3 is a block diagram of the testing apparatus in FIG. 1 further comprising a display and an input module according to an embodiment of the present invention.

Referring to FIG. 3 illustrating the testing apparatus 100 according to another embodiment of the present invention, the testing apparatus 100 further comprises a display 17 and an input module 18. The display module 17 displays a user interface. The input module 18 is for test personnel to input a selection associated with the test signal via the user interface. For example, the user interface may display a graphic key configuration similar to the panel of the remote controller 30. The test personnel may edit types and orders of test signals via the input module 18.

Figure 4:
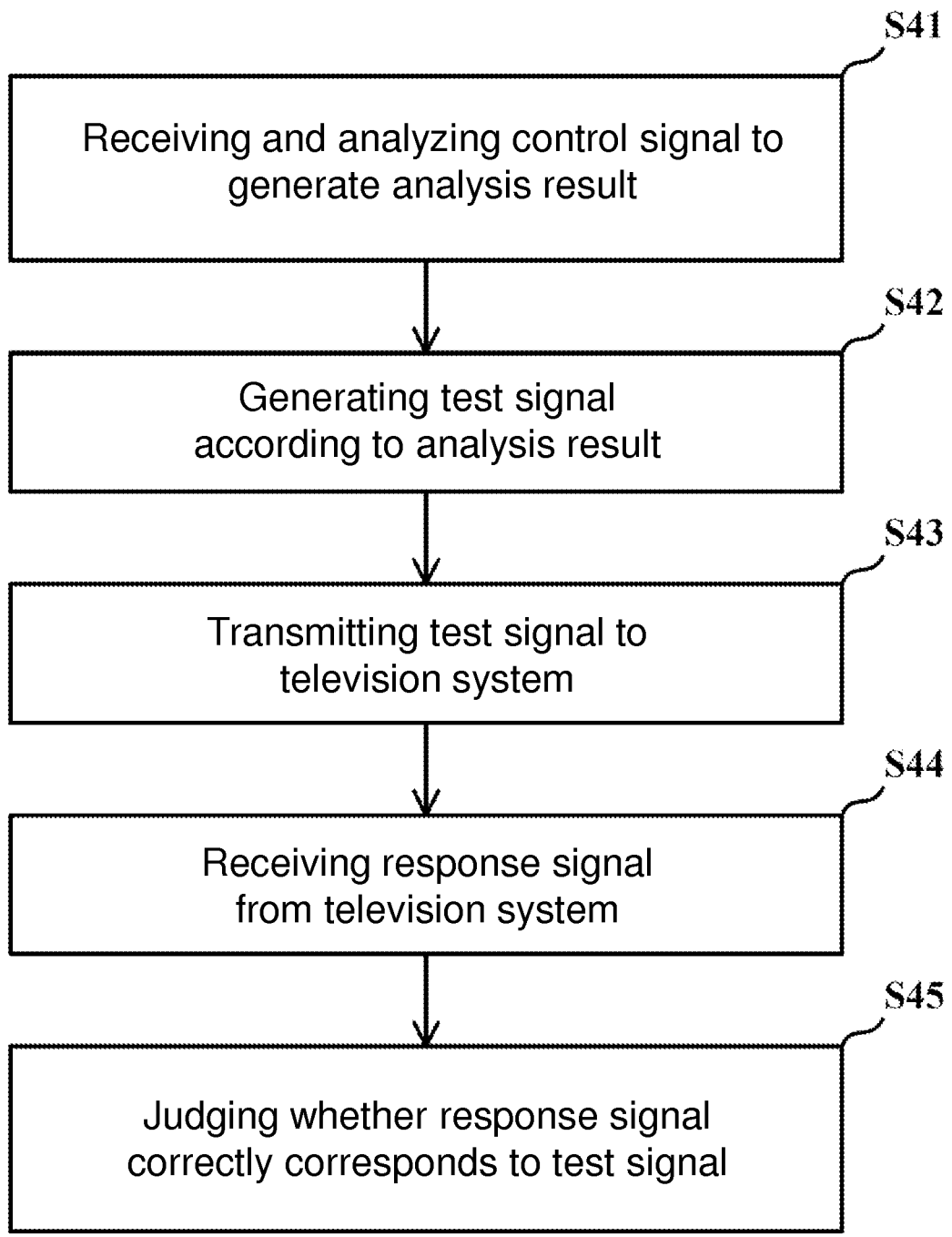
FIG. 4 is a flowchart of a testing method according to an embodiment of the present invention.

According to another embodiment of the present invention, a testing method for a television system is provided. FIG. 4 shows a flowchart of the testing method. In Step S41, a control signal is received and analyzed to generate an analysis result. The control signal is provided by a remote controller of the television system. In Step S42, a test signal is generated according to the analysis result. In Step S43, the test signal is transmitted to the television system. In Step S44, a response signal from the television system is received. In Step 45, it is judged whether the response signal correctly corresponds to the test signal.

In practice, Step S44 may also comprise receiving the response signal via data transmission interface from the television system, or capturing a displayed image of the television system and selecting the captured result as the response signal. Similarly, the process may further comprise a storing step for storing the analysis result generated in Step S41 to a database. Correspondingly, Step S42 may comprise selecting an analysis result from the database according to a feature of the television system and generating the test signal according to the analysis result. The process may further comprise a modification step, in which the control signal and the test signal are compared to generate a signal modification suggestion. Details described in the previous embodiment are applicable to the testing method, and are omitted herein.

Therefore, a testing apparatus and a testing method for a television system are disclosed by the present invention. By automating and making good use of most part of a test procedure, the testing apparatus and testing method of the present invention are capable of reducing a large amount of human resource costs to increase overall testing efficiency.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A testing apparatus for a television system, comprising:
an analysis module, for receiving and analyzing a control signal to generate an analysis result;
a signal generating module, for generating a test signal according to the analysis result;
a transmitting module, for transmitting the test signal to the television system;
a receiving module, for receiving a response signal from the television system; and
a judging module, for judging whether the response signal correctly corresponds to the test signal.

2. The testing apparatus according to claim 1, wherein the control signal and the test signal are infrared signals or radio frequency (RF) signals.

3. The testing apparatus according to claim 1, wherein the receiving module receives the response signal from the television system via a data transmission interface.

4. The testing apparatus according to claim 1, wherein the receiving module comprises a capturing module for capturing a displayed image of the television system to generate a captured result as the response signal.

5. The testing apparatus according to claim 4, wherein the judging module compares the response signal and a reference image to judge whether the response signal correctly corresponds to the test signal.

6. The testing apparatus according to claim 1, further comprising:
a storing module, for storing a plurality of analysis results corresponding to a plurality of types of television systems;
wherein, the signal generating module selects the analysis result corresponding to the television system, and generates the test signal according to the analysis result.

7. The testing apparatus according to claim 6, wherein the analysis module further receives and analyzes the analysis result to generate a signal modification suggestion, the signal modification suggestion is used for modifying the analysis result corresponding to the control signal to generate a modified analysis result, and the signal generating module further generates the test signal according to the modified analysis result.

8. The testing apparatus according to claim 1, wherein the analysis module further receives and analyzes the analysis result to generate a signal modification suggestion, and the signal generating module further generates the test signal according to the signal modification suggestion.

9. The testing apparatus according to claim 1, wherein the analysis result comprises a signal length and a signal timing of the control signal.

10. The testing apparatus according to claim 1, wherein the test signal comprises a plurality of sub test signals, the transmitting module successively transmits the sub test signals to the television system, and the sub test signals comprise a power-on signal, a power-off signal, a volume-adjusting signal, and a channel-selecting signal.

11. The testing apparatus according to claim 10, further comprising:
a display, for displaying a user interface; and
an input module, for inputting a selection associated with the test signal via the user interface, the selection comprising at least one of types and an order of the sub test signals.

12. A method for testing a television system, comprising:
a) receiving and analyzing a control signal to generate an analysis result;
b) generating a test signal according to the analysis result;
c) transmitting the test signal to the television system;
d) receiving a response signal from the television system; and
e) judging whether the response signal correctly corresponds to the test signal.

13. The testing method according to claim 12, wherein the control signal and the test signal are infrared signals or RF signals.

14. The testing method according to claim 12, wherein the step of receiving a response signal from the television system comprises receiving the response signal via a data transmission interface from the television system.

15. The testing method according to claim 12, wherein the step of receiving a response signal from the television system comprises capturing a display image of the television system to generate a captured result as the response signal.

16. The testing method according to claim 15, wherein the step of judging whether the response signal correctly corresponds to the test signal comprises comparing the response signal and a reference image to judge whether the response signal correctly corresponds to the test signal.

17. The testing method according to claim 12, between the steps of generating an analysis result and generating a test signal, storing the analysis result to a database;
wherein, the generating a test signal according to the analysis result comprises selecting the analysis result according to a feature of the television system from the database, and generating the test signal according to the analysis result.

18. The testing method according to claim 17, further comprising:
receiving the test signal;
comparing the control signal and the test signal to generate a signal modification suggestion; and
modifying the analysis result stored in the database according to the signal modification suggestion.

19. The testing method according to claim 12, between the steps (b) and (c), further comprising:
receiving the test signal;
comparing the control signal and the test signal to generate a signal modification suggestion; and
modifying the analysis result with reference to the signal modification suggestion.

20. The testing method according to claim 12, wherein the analysis result comprises a signal length and a signal timing of the control signal.

21. The testing method according to claim 12, wherein the test signal comprises a plurality of sub test signals, the step of transmitting the test signal to the television system successively transmits the sub test signals to the television system, and the sub test signals comprise a power-on signal, a power-off signal, a volume-adjusting signal, and a channel-selecting signal.

22. The testing method according to claim 12, between the steps of generating an analysis result and generating a test signal, providing a user interface for inputting a selection associated with the test signal via the user interface, the selection comprising at least one of types and an order of the sub test signals.

* * * * *